United States Patent [19]

Beuch et al.

[11] 4,173,427

[45] Nov. 6, 1979

[54] GRIPPING DEVICE FOR MAGNETIC DISKETTES

[75] Inventors: Wallace E. Beuch, Pine Island; Michael N. Zell, Rochester, both of Minn.

[73] Assignee: International Business Machines Corporation, Armonk, N.Y.

[21] Appl. No.: 888,601

[22] Filed: Mar. 20, 1978

[51] Int. Cl.² .................................................. G11B 17/22
[52] U.S. Cl. ...................................... 414/751; 198/486; 198/650; 198/695; 294/99 R; 271/268; 360/98; 414/416
[58] Field of Search .............................. 214/1 BB, 1.7, 301, 214/309, 310; 271/85, 18, 268; 274/9 RA, 10 D; 294/86 R, 99 R; 360/97, 98, 133; 198/486, 650, 695

[56] References Cited

U.S. PATENT DOCUMENTS

| | | | |
|---|---|---|---|
| 1,839,507 | 1/1932 | Smith | 274/10 C |
| 3,008,721 | 11/1961 | Corbett et al. | 274/10 C |
| 3,199,653 | 8/1965 | McGowan | 271/85 X |
| 3,537,627 | 11/1970 | Batts | 223/96 |
| 3,790,205 | 2/1974 | Wenz | 294/118 X |
| 3,901,391 | 8/1975 | Carlson et al. | 214/6 DK X |

FOREIGN PATENT DOCUMENTS 996996  6/1965  United Kingdom ................. 271/85

*Primary Examiner*—L. J. Paperner
*Attorney, Agent, or Firm*—Keith T. Bleuer

[57] ABSTRACT

A gripping or picker device, particularly for a jacketed magnetic disk or diskette, comprising a pair of arms extending along each other and fixed with respect to a common support and having outwardly diverging cam surfaces on their distal ends to provide a throat into which an article may be thrust. One of the arms has a flat leaf spring portion for moving the arms together, and the arms have plane substantially parallel facing surfaces connected with said cam surfaces for gripping the article frictionally when the article is thrust between the arms. One of the cam surfaces extends farther toward the common support than the other so that it faces the plane support surface of the other arm, and one of the arms has a stop portion abutting the other arm to limit the approaching movement of the arms toward each other to a distance which is equal to or greater than the thickness of the article to be gripped. A portion of one of the plane surfaces which is opposite the cam surface of the other arm engages the diskette as the picker device is drawn off of the diskette to provide a frictional effect thereon so that the arms do not squeeze the article out from between the arms.

8 Claims, 8 Drawing Figures

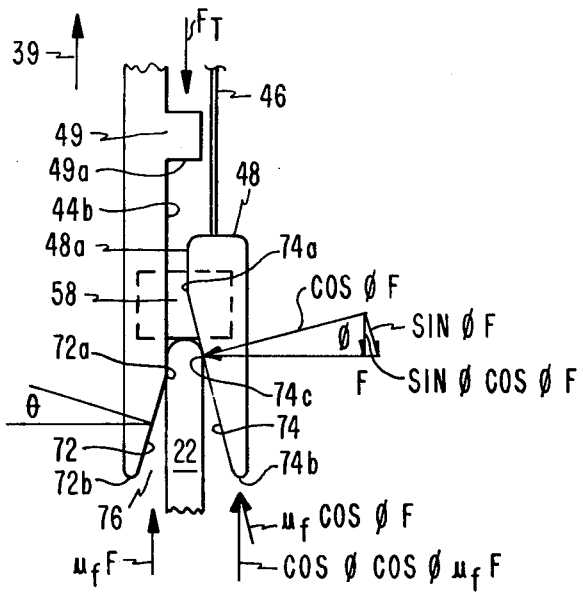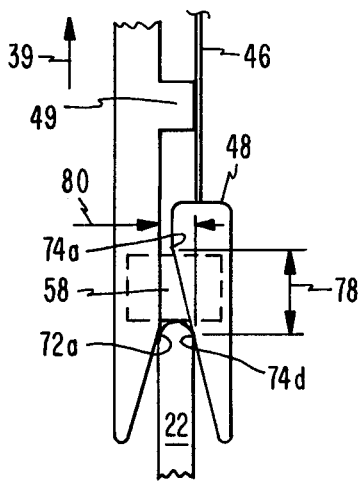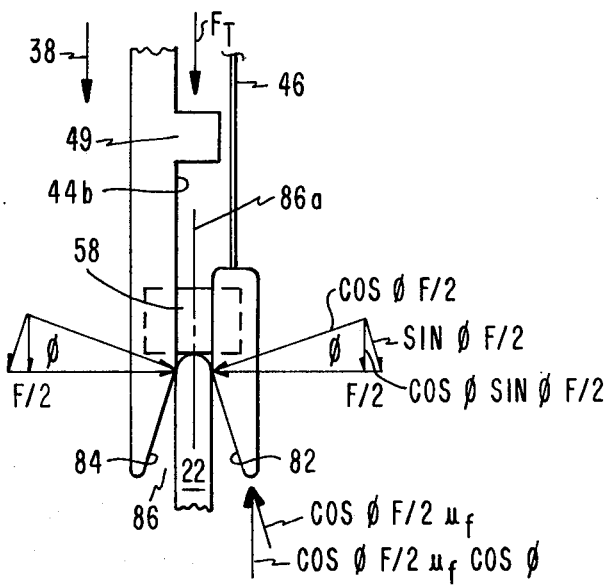

GRIPPING DEVICE FOR MAGNETIC DISKETTES

CROSS REFERENCES TO RELATED APPLICATIONS

The gripping device herein described may be used in the magnetic file machine disclosed in a patent application by Wallace E. Beuch and Michael N. Zell, Ser. No. 888,603, filed Mar. 20, 1978 and disclosed in a patent application by D. O. Castrodale and T. R. Fournier, Ser. No. 888,437, filed Mar. 20, 1978. Details of a magazine useful with the gripping device herein described is disclosed in a patent application by D. Wilson, F. Wilkey and W. Aderman, Ser. No. 888,436, filed Mar. 20, 1978, and in a patent application by D. R. Wilson, Ser. No. 888,435, filed Mar. 20, 1978, and in a patent application by M. E. Bothun, C. A. Larson, G. E. Lightner and D. R. Wilson, Ser. No. 888,438, filed Mar. 20, 1978.

BACKGROUND OF THE INVENTION

The invention relates to disks containing information on surfaces thereof and more particularly to magnetic diskettes, such as of the type disclosed in U.S. Pat. No. 3,668,658. Still more particularly, the invention relates to gripping mechanism for use with such diskettes whereby the diskettes may be moved between different positions.

Records of the phonograph type have been previously moved between playing and storage positions by means of pincers devices. Dahlstrom U.S. Pat. No. 1,970,417, for example, discloses gripping jaws 174 and 176 (referring particularly to FIG. 7 of the patent) which are swung toward each other into record engaging positions; and the jaws, while engaging the record, transport the record between different positions. Smith U.S. Pat. No. 1,839,507 discloses divergent fingers 20 (referring in particular to FIG. 5 of the patent) which constitute a record carrier or gripper along with other associated mechanisms. These pincers devices are however not so constructed that a record or diskette may be forced into the pincers devices against any spring closing forces incorporated in them and so that such forces will not tend to squeeze the record or diskette outwardly from the devices when the devices are pulled off of the record or diskettes.

SUMMARY OF THE INVENTION

It is an object of the present invention to provide an improved gripping mechanism particularly suitable for a magnetic diskette of the type disclosed in U.S. Pat. No. 3,668,658 and in particular one that is of such construction that it may pull the diskette into a final data transferring position and be disengaged from the diskette in this position without tending to squeeze the diskette out of its grasp when the gripping mechanism is drawn off of the diskette in the final position of the diskette. More particularly, it is an object of the invention to provide an improved gripping mechanism including a pair of arms and spring means for moving the arms together so that the arms may grip a diskette or the like and incorporating cam surfaces on the distal ends of the arms so that the diskette may be thrust into the gripping mechanism against spring action. Still more particularly, it is an object of the present invention to provide cam surfaces on the distal ends of the arms so that the gripping mechanism actually functions to retain the diskette between them rather than thrusting it out from between them as the gripping mechanism is drawn off of the diskette in a final data transferring position of the diskette.

In its preferred form, the diskette gripping mechanism of the invention comprises a pair of arms extending along side of each other and having an end of each embedded in a common support. One of the arms is made of rigid material, and the other arm has a flat flexible spring portion constituting spring means for moving the arms toward each other. The arms have substantially parallel adjacent diskette engaging faces which frictionally hold the diskette, and a stop is provided on the rigid arm limiting the motion of the other arm so as to maintain the faces spaced with respect to each other. The arms have outwardly diverging facing cam surfaces on their distal ends joining with the diskette engaging surfaces on the arms, and one of the cam surfaces is longer than the other and extends along side of and opposite a portion of the diskette engaging surface of the other arm. The stop on the rigid arm holds the arms apart so that the spacing between the arms at the end of the diskette engaging surface most remote from the common support is spaced from an opposite point on the cam surface of the other arm at a distance equal or greater than the thickness of the diskette. This is so that, as the gripping mechanism is drawn off of the diskette, the diskette is not thrust out from between the arms which would move the diskette out of a desired data transferring position in which the diskette gripping mechanism moves the diskette.

BRIEF DESCRIPTION OF THE DRAWINGS

FIG. 6 is a fragmentary plan view of the diskette gripping device of the invention in partial disengagement with the diskette;

FIG. 7 is a plan view of the same type as FIG. 6 but showing the diskette drawn to a further extent out of the gripping device; and FIG. 8 is a plan view similar to FIGS. 6 and 7 and showing another form of diskette gripping device.

DESCRIPTION OF THE PREFERRED EMBODIMENT

Figure 1:
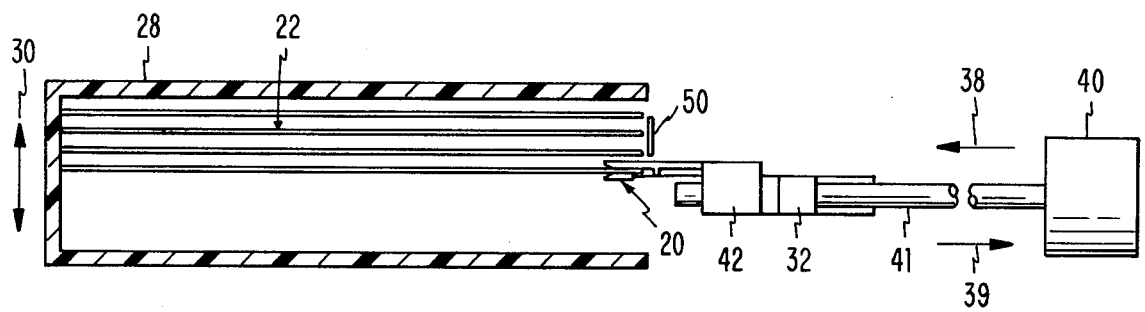
FIG. 1 is a top plan view of a diskette gripping device according to the invention connected with and moveable by a motor toward diskettes within a diskette magazine.
Figure 2:
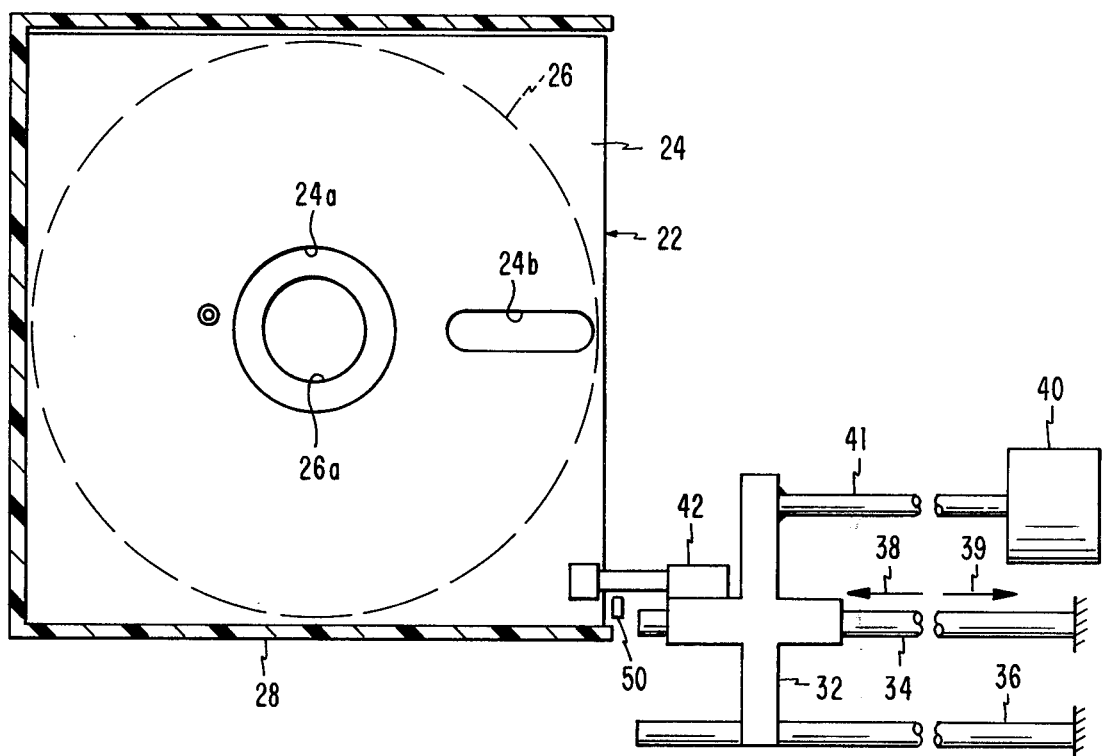
FIG. 2 is a side elevational view of the mechanism shown in FIG. 1.
Figure 5:
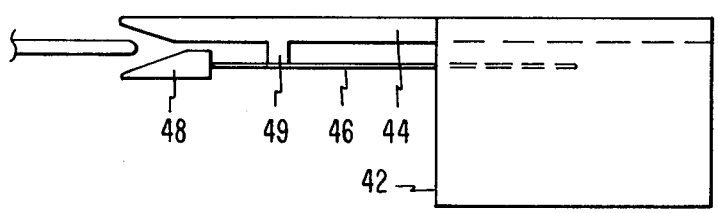
FIG. 5 is a top plan view on an enlarged scale of the diskette gripping device of the invention about to engage with a diskette.

The improved gripping or picker device 20 of the invention may be incorporated in the diskette moving system illustrated in FIGS. 1 and 2. The system includes a plurality of diskettes 22 which may be of the type disclosed in U.S. Pat. No. 3,668,658 and each of which includes an outer jacket 24 and a magnetic disk 26 of thin flexible material within the jacket 24. The diskettes 22 are initially disposed in a storage magazine 28, and the magazine 28 may contain suitable internal ribs and grooves for holding the diskettes 22 separated. The magazine 28 is moveable in direction 30 under actuation by any suitable power source. The disk 26 of each of the diskettes 22 has a central opening 26a through it, and the jacket 24 has somewhat larger central openings 24a and elongate openings 24b through its two thicknesses. Suitable magnetic transducers may extend through the openings 24b to thus be in contact with the disk 26 as it rotates for data transferring action.

The picker device 20 is fixed with respect to a carriage 32 which is slidably disposed on a pair of guide rods 34 and 36. The carriage 32 is moveable in directions 38 and 39 by means of a motor 40 of any suitable construction capable of moving the picker device 20 toward and away from the magazine 28.

The picker device 20 comprises a base 42 of plastic, for example, having a rigid arm 44 fixed to it. A moveable arm 46 having a tip portion 48 is located opposite the arm 44. The arm 46 except for its tip portion 48 is leaf spring steel so that the inherent resiliency of the arm 46 swings it toward the arm 44. One end of the arm 46 is embedded in the base 42, and the tip portion 48 is of relatively rigid material, such as plastic. The arm 44 is provided with a boss portion 49 extending toward the arm 46 and constituting a stop for limiting the swinging movement of the arm 46 toward the arm 44. With no separating force on the arms 44 and 46, the stop portion 49 is in contact with the arm 46. The picker device 20 is adapted to withdraw diskettes 22 from the magazine 28, and an interposer 50 is disposed at the open end of the magazine 28 (see FIG. 2) for selectively holding the diskettes 22 within the magazine 28 when the picker device 20 is moved in direction 39 by the action of the motor 40. The interposer 50 may be moved across the open end of the magazine 28 by suitable motor propelling means.

Figure 3:
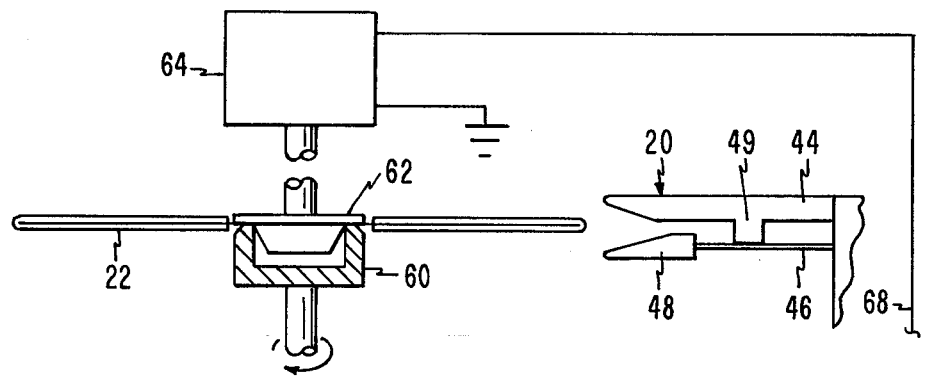
FIG. 3 is a top plan view of a diskette and diskette gripping device in different positions than shown in FIG. 1, with the diskette being aligned with a rotary drive spindle and a disk engaging collet.
Figure 4:
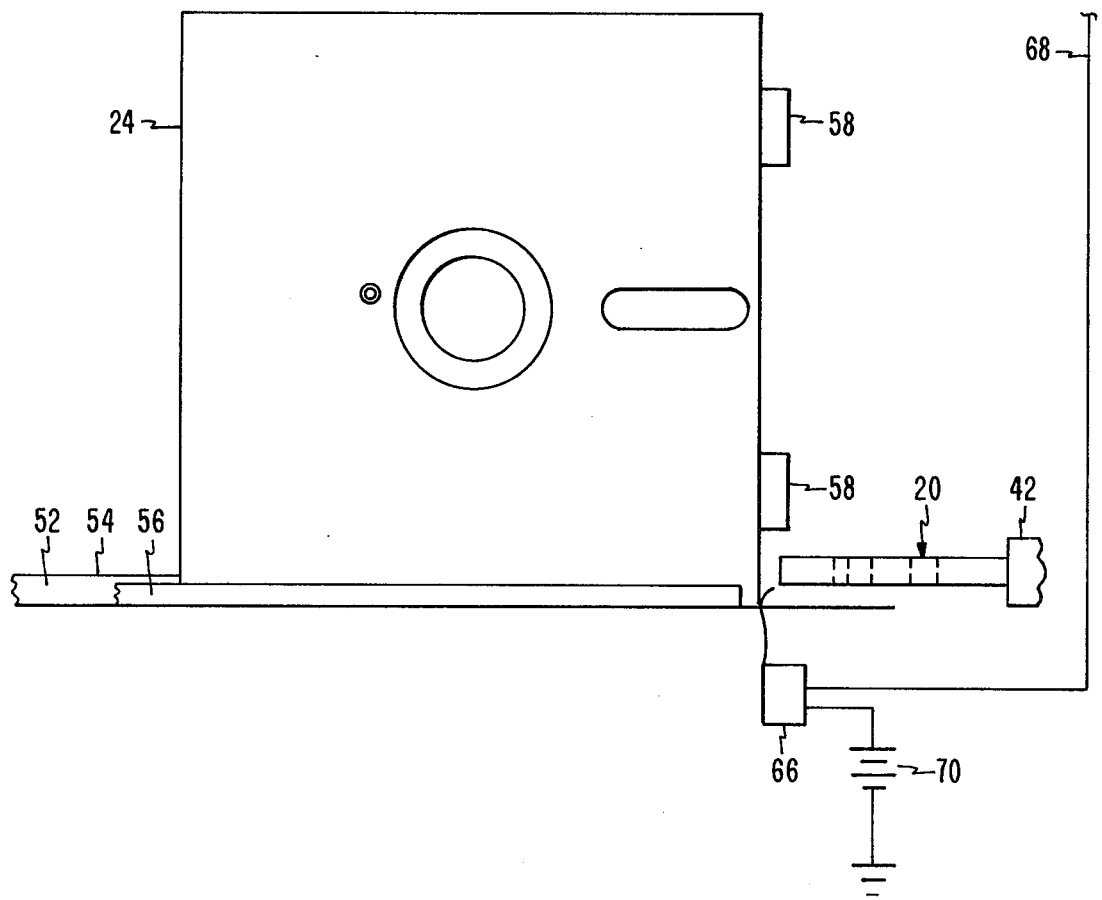
FIG. 4 is a side elevational view of the diskette and gripping device in their positions shown in FIG. 3.

A diskette 22 in alignment with the picker device 20 is adapted to be moved out of the magazine 28 by the picker device 20 into an elongate slot 52 formed by upstanding ribs 54 and 56 (see FIG. 4) which are parallel with the rails 34 and 36. The diskette 22 is disposed in the magazine 28 in a plane parallel with the rails 34 and 36, the ribs 54 and 56, and the arm 44 (particularly the internal arm surface 44b, see FIG. 6). The gripper device 20 moves the diskette 22 in direction 39 into its position as illustrated in FIGS. 3 and 4 which is the final or rest position of the diskette 22 at which transducers may be moved through the jacket openings 24b for data transferring action with respect to the disk 26 of the diskette 22. Stops 58 limit the movement of the diskette 22 in the direction 39, and in this position the central opening 26a of the disk 26 is in axial alignment with the longitudinal centers of a drive spindle 60 and a collet 62. The drive spindle 60 is rotatably driven by any suitable power source (not shown), and the collet 62 is adapted to be moved toward the spindle 60 so as to grip the disk 26 between the collet 62 and spindle 60. A motor 64 of any suitable construction is provided for moving the collet 62 toward the spindle 60 for this disk engaging action.

A sensor in the form of a limit switch 66 is actuated by the diskette 22 illustrated in FIGS. 3 and 4 when the diskette 22 is in its final position. The limit switch 66 is connected by a lead 68 with the motor 64, and a suitable electric circuit including a battery 70 is provided for causing the motor 64 to be active to engage the disk 26 between the collet 62 and spindle 60 when the switch 66 is activated by the diskette 22 in its final position illustrated in FIGS. 3 and 4.

The arm 44 and the rigid end portion 48 of the arm 46 are provided with outwardly diverging cam surfaces 72 and 74 as shown particularly in FIG. 6. The cam surface 72 extends from a point 72a to a point 72b at the end of the arm 44. The cam surface 74 extends from a point 74a to a point 74b at the end of the arm portion 48, and the arm ends 72b and 74b are in substantial alignment transversely of the gripper device 20 (at right angles to the directions 38 and 39 and to the rails 34 and 36). The cam surfaces 72 and 74 are substantially flat and form a throat 76 into which the diskette may be thrust with movement of the picker device 20 toward the magazine 28. It will be observed that the cam surface 74 is longer than the cam surface 72, since the point 74a is closer to the base 42 than is the point 72a. A diskette 22 is illustrated in FIG. 6 thrust into the throat 76, and it will be observed that the diskette 22 is in contact with an intermediate point 74c of the cam surface 74 while resting on the inner longitudinal plane surface 44b of the arm 44. At this time, the arms 44 and 46 are spread apart so that the stop portion 49 is out of contact with the arm 46.

FIG. 6 shows the condition of the picker device 20 as the device 20 is partially withdrawn from the diskette 22, with the diskette 22 contacting the end stops 58 and the picker device 20 continuing to move in the direction 39 under the action of the motor 40. FIG. 7 shows the condition of the picker device 20 after the picker device 20 has moved an additional distance in the direction 39 sufficient to cause the arm 46 to make contact with the stop portion 49. Under these conditions, the diskette 22 makes contact with the beginning end point 72a of the cam surface 72, and the diskette 22 makes contact with an opposite point 74d on the cam surface 74 which is between the point 74c and the end point 74b of the cam surface 74. FIG. 7 also shows the pressure angle offset distance 78 which is the distance between the beginning points 74a and 72a of the cam surfaces 72 and 74 measured longitudinally of the picker device 20 (in the direction of the arm 44). FIG. 7 also shows the dimension 80 which is the spacing between the points 74d and 74a measured transversely of the arm 44 when the stop portion 49 is in contact with the arm 46. The dimension 80 is shown as being equal to the thickness of the diskette 22 which is in contact at this time with both of the points 74d and 72a. For best operation in accordance with the teachings of the invention as to be hereinafter described, the dimension 80 should be equal to or greater than the thickness of the diskette 22.

The various vectors appearing in FIG. 6 illustrate the various forces on the diskette 22 as the picker device 20 is being withdrawn from the diskette 22. The picker device 20 is in continued movement in direction 39 with the diskette 22 stationary, the end stops 58 being effective to hold the diskette 22 from further movement in direction 39. The quantity F is the clamp force of the arms 44 and 46 on the diskette 22 in the direction transversely of the arm 44. This clamp force may be for example 1.1 lb. The angle $\phi$ is the pressure angle at the point 74c at which the diskette 22 contacts the cam surface 74, being that angle between a line extending transversely to the arm surface 44b and a line normal to the cam surface 74 at the point 74c. The pressure angle $\phi$ may be 15°, for example. Since the arm ends 72b and 74b are directly opposite each other (on the same transverse line perpendicular to the rails 34 and 36 and to the arm surface 44b) and since the cam surface 74 is longer than the cam surface 72, the angle $\phi$ between a line transverse to the surface 44b and a normal to the cam surface 72 is greater than the angle $\phi$ measured in the same manner for the cam surface 74. The quantity $\mu_f$ constitutes the coefficient of moving friction between the jacket 24 of the diskette 22 and the surface 44b of the arm 44. This coefficient of friction may be 0.2, for example. The quantity $F_T$ is the force on the diskette 22 in the plane of the diskette 22 and tending to either move the diskette 22 out from between the arms 44 and 46 or being in the opposite direction.

A mathematical analysis will show that the force $F_T$ for the cam surfaces 72 and 74 of FIG. 6 is as follows:

$$F_T = F[\sin\phi \cos\phi - \mu_f(1+(\cos\phi)^2)]$$

With the quantities $\mu_f$ and $\phi$ and F being 0.2, 15° and 1.1 lb. respectively as mentioned above (and these are reasonable magnitudes for these quantities), the force $F_T$ is as follows:

$$F_T = 1.1[(0.258)(0.965) - 0.2(1+0.965^2)]$$

$$F_T = 1.1(0.248 - 0.386)$$

$$F_T = -0.15 \text{ lbs.}$$

As will be observed from the last equation above, the force $F_T$ equals $-0.15$ lbs., indicating that the friction between the diskette 22 on the surface 44b exceeds the force due to the cam surface 74 tending to expel the diskette 22 from between the arms 44 and 46, so that the arms 44 and 46 actually tend to hold the diskette 22 between them rather than moving the diskette 22 outwardly in the direction of the force $F_T$.

FIG. 8 illustrates a modification in which the cam surfaces 74 and 76 are replaced by cam surfaces 82 and 84. The cam surfaces 82 and 84 are directly opposite each other as contrasted to having a pressure angle offset 78. The vectors in FIG. 8 also indicate the various forces and angles effective with respect to a diskette 22 and applying substantially the same mathematical analysis as above mentioned, the following equation is indicative of the force $F_T$ tending to move the diskette 22 out from between the surfaces 84 and 86:

$$F_T = \cos\phi F(\sin\phi - \mu_f \cos\phi)$$

Using the same dimensions for the quantities $\mu_f$, $\phi$ and F of 0.2, 15° and 1.1 lbs. previously used, $F_T$ is thus indicated to be:

$$F_T = (0.965)(1.1)[0.258 - 0.193]$$

$$F_T = 0.069 \text{ lbs.}$$

It will be observed that the quantity $F_T$ in this case is the plus quantity of 0.069 lbs., indicating that in this case the arms 44 and 46 tend to expel the diskette 22 from between them due to the divergent cam surfaces 82 and 84 simultaneously effective on the end of the diskette 22.

The operation of the mechanism above described will now be set forth assuming firstly that the arms 44 and 46 have the directly opposed and equal angle ($\phi$) cam surfaces 82 and 84 shown in FIG. 8 formed on them. Referring to FIGS. 1 and 2, the magazine 28 is positioned in its travel 30 so that the central plane of one of the diskettes 22 is in alignment with the center line 86a of the throat 86 formed by the cam surfaces 82 and 84 (parallel with arm surface 44b), and the stop portion 49 is in contact with the arm 46. The interposer 50 is held out of alignment with this particular diskette 22 and out of alignment with the arms 44 and 46, and the motor 40 moves the picker device 20 in the direction 38 so as to move the cam surfaces 82 and 84 over the diskette 22, with the arms 44 and 46 embracing and gripping the diskette. The diskette 22 has a camming action on the cam surfaces 82 and 84 and thus moves the arms 44 and 46 apart against the spring action of the arm 46, and the picker device is preferably moved sufficiently onto the diskette 22 so that the diskette 22 is in close proximity to the stop portion 49. The motor 40 then moves the picker device 20 in the direction 39 and pulls the diskette embraced by the arms 44 and 46 at least partially out of the magazine 28 to its rest or data transferring position as shown in FIGS. 3 and 4 in which the diskette 22 is in contact with the stops 58. The motor 40 continues the movement of the picker device 20 until the arms 44 and 46 snap off of the diskette 22 and are completely freed from the diskette 22. It may be noted that it is desirable to completely disengage the device 20 with respect to a diskette 22 in the data transferring position of the diskette shown in FIGS. 3 and 4, since the device 20 may somewhat impede and disturb the rotation and flatness of the disk due to gripping action. The device 20 is thus shown in FIGS. 3 and 4 completely disengaged from the diskette 22.

The diskette 22 in traveling to its position shown in FIGS. 3 and 4 moves through the groove 52 and may have a slight frictional action with respect to the sides of the ribs 54 and 56 forming the groove 52. If this frictional action is sufficient, the diskette 22 remains in its position shown in FIGS. 3 and 4 after the picker device 20 separates from the diskette 22, and in this case the sensor switch 66 remains closed due to the action of the diskette 22 on it. The electric circuit including the line 68, switch 66, battery 70 and motor 64 is then completed; and the motor 64 is effective to move the collet 62 toward the spindle 60 for thereby gripping the disk 26 of the diskette 22 between the spindle 60 and collet 62. The disk 26 is thus rotated by the driving action of the spindle 60, and data transferring action may thus take place with respect to the disk 26.

As has been previously described, the action of the cam surfaces 82 and 84 as the arms 44 and 46 are drawn off of the diskette 22 and as the picker device 20 moves to its position as illustrated in FIGS. 3 and 4 is to provide an expelling force for the diskette 22 out from between the arms 44 and 46. If the frictional effect of the diskettes 22 on the sides of the ribs 54 and 56 is not sufficient to hold the diskette 22 in its position illustrated in FIGS. 3 and 4, the diskette 22 will move away from the stops 58 as the arms 44 and 46 are drawn off from the diskette 22. The center of the hole 26a of the disk 26 would then be out of alignment with the centers of the collet 62 and spindle 60. It would be undesirable to have the collet 62 move toward the spindle 60 to engage the disk 26 between them at this time, since there would be misregistration of the disk 26 with the collet 62 and spindle 60. The switch 66 is opened when the diskette 22 moves away from the stops 58, and the opened switch 66 holds the motor 64 in deactivated condition and prevents the motor 64 from moving the collet 62 toward the spindle 60 to engage the disk 26 between them.

Whenever it is desired that the diskette 22 shown in position in FIGS. 3 and 4 be moved back into the magazine 28, the action of the motor 40 is reversed; and the picker device 20 is caused to move in direction 38 to move the diskette 22 in the groove 52 back into the magazine 28. The picker device 20 may not initially grip the diskette 22; but it at least does so when the diskette 22 strikes the end of the magazine 28, since the strokes of the picker device 20 in the directions 38 and 39 are equal. In the event some impediment, such as in groove 52, exists to this movement of diskette 22 in direction 38; the stop 49, and particularly its surface 49a extending at right angles to the surface 44b, limits the movement of the diskette into the picker device 20, so that the interposer 50 may subsequently be operative. When the diskette 22 is completely within the magazine 28, the interposer 50 is moved inwardly behind the diskette 22, and the interposer 50 prevents any retraction of the diskette 22 out of the magazine 28 at this time. The motor 40 then reverses the direction of movement of the picker device 20 and retracts the picker device 20 out of the magazine 28, so that the magazine 28 may be moved in direction 30 to move another of the diskettes 22 within the magazine 28 into alignment with the picker device 20.

As has been above described, the equal angled, opposite cam surfaces 82 and 84 provide an expelling force on the diskette 22 in its position of FIGS. 3 and 4 in contact with the stops 58. The pressure angle offset 78 of the cam surfaces 74 and 76 shown in FIGS. 1-7 provided in accord with the teachings of the invention actually provides a retaining force on the diskette 22 as the picker device 20 is separated from the diskette 22 in contact with the stops 58 in further movement in the direction 39 as has been explained. This is by virtue of the friction effect of the diskette 22 on the inner longitudinal plane surface 44b of the arm 44 as has been previously described. Therefore the offset cam surfaces 72 and 74 used on the arms 44 and 46 provide a more reliable moving action with respect to the diskette 22 and cause the diskette 22 when once brought into contact with the stops 58 to remain in contact with the stops 58. Thus in each case in which a diskette 22 is moved out of the magazine 28 by motor 40 to the position of FIGS. 3 and 4 for a reading or writing action, the diskette 22 remains in its position for data transfer. The action of the picker device 20 under the action of the motor 40 remains the same in moving a diskette 22 into its various positions as has been described in connection with the picker device having the equal and opposite cam surfaces 82 and 84.

In order that the cam surfaces 72 and 74 may have their effect of holding a diskette 22 between them as the arms 44 and 46 are drawn off and away from the diskette 22, it is only necessary that the distance 80, between the points 72a and 74d be equal to or greater than the thickness of a diskette 22. The diskette thickness may be for example about 1.5 mm. Although the exemplary angle of 15° has been mentioned for the angle $\phi$ shown in FIGS. 1-7, the angle $\phi$ may well vary between 10° and 25° with satisfactory operation of the cam surfaces 72 and 74. As above mentioned, preferably the frictional effect of the surface 44b on a diskette 22 should be greater than the expelling force by the cam surface 74 on the diskette 22 in order that the arms 44 and 46 may act to retain the diskette 22 between them as the picker device 20 is drawn off of the diskette 22; and, for this condition to exist, the following equation setting forth the relationship between $\phi$ and $\mu_f$ (the coefficient of moving friction between the diskette jacket 24 and arm surface 44b) should apply:

$$(\sin \phi \cos \phi) < \mu_f [1 + (\cos \phi)^2]$$

Although the spring means swinging the distal ends of the arms 44 and 46 together is described as being the leaf spring portion of the arm 46, it is apparent that the arm 46 could be rigid for its complete length and a separate spring could be provided for this purpose.

We claim:
1. Mechanism for gripping an article and moving it from one place to another and including:
   a pair of arm portions mounted with respect to a common support and moveable toward and away from each other so as to embrace the article between them,
   spring means for moving said arm portions together so that they grip the article and so that the article is moved along with said common support, and
   outwardly diverging cam surfaces formed on facing sides of said arm portions and forming a throat into which the article to be moved may be thrust so as to spread the arm portions apart and cause them to grip the article due to said spring means,
   said cam surfaces being of different lengths and said arm portion with the shorter cam surface having an article gripping surface opposite said longer cam surface whereby, as the article travels down the longer cam surface in being withdrawn from between said arm portions, the article frictionally moves on said article gripping surface to be thereby frictionally restrained from being separated from the arm portion having said article gripping surface.

2. Mechanism as set forth in claim 1 and including motor means connected with said common support for thereby moving the common support and the article gripped by said arm portions in a certain path into a rest position of the article, and an interposer selectively moveable into said path so as to block movement of said article so as to allow said motor means to move said common support and thereby said arm portions into positions in which said arm portions are separated from said article.

3. Mechanism as set forth in claim 1 and including stop means on one of said arm portions and adapted to contact the other arm portion as they move together under the action of said spring means to limit the spacing between the end of said article gripping surface most remote from said common support and the opposite point on said longer cam surface to a thickness equal to or greater than the thickness of the portion of the article gripped by said arm portions.

4. Mechanism as set forth in claim 1, said spring means being formed by a flat leaf spring portion connecting one of said arm portions and said common support.

5. Mechanism as set forth in claim 1 and including stop means on one of said arm portions extending transversely with respect to said article gripping surface portion for limiting the movement of the article over said longer cam surface and said article gripping surface.

6. Mechanism as set forth in claim 1, the relationship between (1) the angle $\phi$ between a normal to said longer cam surface and a normal to said article gripping surface and (2) the coefficient $\mu_f$ of moving friction between said article and said article gripping surface being defined as follows:

$$(\sin \phi \cos \phi) < \mu_f[1 + (\cos \phi)^2].$$

7. Mechanism as set forth in claim 1 and including means for moving said common support in a certain path from which said cam surfaces outwardly diverge, said article gripping surface being planar and lying substantially parallel with said path.

8. Mechanism for gripping an article and moving it from one place to another and including:

a pair of arm portions mounted with respect to a common support and moveable toward and away from each other so as to embrace the article between them, spring means for moving said arm portions together so that they grip the article and so that the article is moved along with said common support, and outwardly diverging cam surfaces formed on facing sides of said arm portions and forming a throat into which the article to be moved may be thrust so as to spread the arm portions apart and cause them to grip the article due to said spring means, one of said cam surfaces being formed so as to frictionally restrain the article as it is withdrawn from between the arm portions, said cam surfaces being of different lengths whereby, as the article travels down the longer one of said cam surfaces on one of said arm portions in being withdrawn from between said arm portions, the article frictionally moves on the other of said arm portions to be thereby frictionally restrained from being separated from the latter arm portion.

* * * * *